*US007286515B2*

United States Patent
Olson et al.

(10) Patent No.: US 7,286,515 B2
(45) Date of Patent: Oct. 23, 2007

(54) METHOD, APPARATUS, AND SOFTWARE PRODUCT FOR DETECTING ROGUE ACCESS POINTS IN A WIRELESS NETWORK

(75) Inventors: Timothy S. Olson, San Jose, CA (US); Daryl A. Kaiser, Los Gatos, CA (US); Pejman D. Roshan, Anaheim, CA (US)

(73) Assignee: Cisco Technology, Inc., San Jose, CA (US)

( * ) Notice: Subject to any disclaimer, the term of this patent is extended or adjusted under 35 U.S.C. 154(b) by 647 days.

(21) Appl. No.: 10/766,174

(22) Filed: Jan. 28, 2004

(65) Prior Publication Data

US 2005/0171720 A1    Aug. 4, 2005

Related U.S. Application Data

(60) Provisional application No. 60/490,847, filed on Jul. 28, 2003.

(51) Int. Cl.
  *H04Q 7/24*    (2006.01)
  *H04L 9/00*    (2006.01)
  *H04M 1/66*    (2006.01)

(52) U.S. Cl. .................. 370/338; 713/155; 455/411; 455/410

(58) Field of Classification Search ............... 370/338, 370/228; 713/201; 455/411, 410
  See application file for complete search history.

(56) References Cited

U.S. PATENT DOCUMENTS 4,254,467 A    3/1981    Davis et al. ................ 345/443

(Continued)

FOREIGN PATENT DOCUMENTS

EP    0 930 514 A2    7/1999

(Continued)

OTHER PUBLICATIONS

"Location Determination Papers", List of publications maintained by Moustafa A. Youssef, Department of Computer Science, University of Maryland, College Park, MD 20742. Available online, and downloaded Feb. 9, 2006 at http://www.cs.umd.edu/~moustafa/location_papers.htm.

(Continued)

*Primary Examiner*—Nick Corsaro
*Assistant Examiner*—Christopher M. Brandt
(74) *Attorney, Agent, or Firm*—Dov Rosenfeld; Inventek

(57) ABSTRACT

A method, an apparatus, and a software program to implement a method to detect a rogue access point of a wireless network. The method includes maintaining an AP database that includes information about managed access point (APs) and friendly APs, including the MAC address of each managed AP. The method further includes sending a scan request to one or more managed APs, including one or more of a request for the receiving managed AP to scan for beacons and probe responses and a request for the receiving managed AP to request its clients to scan for beacons and probe responses. The method further includes receiving reports from at least one of the receiving managed APs, a report including information on any beacon or probe response received that was sent by an AP. For each beacon or probe response on which information is received, the method analyzes the information received in the report about the AP that sent the beacon or probe response, the analyzing including ascertaining if the MAC address of the AP that sent the beacon or probe response matches a MAC address of an AP in the AP database to ascertain whether or not the AP is a potential rogue AP or a managed or friendly AP.

36 Claims, 7 Drawing Sheets

U.S. PATENT DOCUMENTS

| | | | |
|---|---|---|---|
| 5,028,848 A | 7/1991 | Bankston et al. | 315/364 |
| 5,327,144 A | 7/1994 | Stilp et al. | 342/387 |
| 5,394,158 A | 2/1995 | Chia | 342/457 |
| 5,396,582 A | 3/1995 | Kahkoska | 358/1.3 |
| 5,564,079 A | 10/1996 | Olsson | 455/54.1 |
| 5,570,412 A | 10/1996 | LeBlanc | 379/58 |
| 5,666,662 A | 9/1997 | Shibuya | 455/456.4 |
| 5,717,406 A | 2/1998 | Sanderford et al. | 342/457 |
| 5,732,354 A | 3/1998 | MacDonald | 455/456.2 |
| 6,112,095 A | 8/2000 | Wax et al. | 455/456 |
| 6,115,605 A | 9/2000 | Siccardo et al. | 455/426 |
| 6,134,338 A | 10/2000 | Solberg et al. | 382/113 |
| 6,134,448 A | 10/2000 | Shoji et al. | 455/456 |
| 6,140,964 A | 10/2000 | Sugiura et al. | 342/464 |
| 6,167,274 A | 12/2000 | Smith | 455/456.3 |
| 6,198,935 B1 | 3/2001 | Saha et al. | 455/456 |
| 6,212,391 B1 | 4/2001 | Saleh et al. | 455/456 |
| 6,226,400 B1 | 5/2001 | Doll | 382/163 |
| 6,236,365 B1 | 5/2001 | LeBlanc et al. | 342/457 |
| 6,243,811 B1 | 6/2001 | Patel | 713/167 |
| 6,249,252 B1 | 6/2001 | Dupray | 342/450 |
| 6,259,406 B1 | 7/2001 | Sugiura et al. | 342/457 |
| 6,269,246 B1 | 7/2001 | Rao et al. | 455/456 |
| 6,272,541 B1 | 8/2001 | Cromer et al. | 709/224 |
| 6,275,190 B1 | 8/2001 | Sugiura et al. | 342/464 |
| 6,282,427 B1 | 8/2001 | Larsson et al. | 455/456 |
| 6,304,218 B1 | 10/2001 | Sugiura et al. | 342/464 |
| 6,317,599 B1 | 11/2001 | Rappaport et al. | 455/446 |
| 6,317,604 B1 | 11/2001 | Kovach, Jr. et al. | 455/456.5 |
| 6,414,634 B1 | 7/2002 | Tekinay | 342/453 |
| 6,415,155 B1 | 7/2002 | Koshima et al. | 455/456 |
| 6,441,777 B1 | 8/2002 | McDonald | 342/357.06 |
| 6,456,892 B1 | 9/2002 | Dara-Abrams et al. | 700/83 |
| 6,526,283 B1 | 2/2003 | Jang | 455/456 |
| 6,556,942 B1 | 4/2003 | Smith | 702/150 |
| 6,581,000 B2 | 6/2003 | Hills et al. | 701/207 |
| 6,664,925 B1 | 12/2003 | Moore et al. | 342/451 |
| 6,674,403 B2 | 1/2004 | Gray et al. | 342/463 |
| 6,704,352 B1 | 3/2004 | Johnson | 375/224 |
| 6,728,782 B1 | 4/2004 | D'Souza et al. | 709/242 |
| 6,754,488 B1 | 6/2004 | Won et al. | 455/424 |
| 6,766,453 B1 | 7/2004 | Nessett et al. | 713/171 |
| 6,799,047 B1 | 9/2004 | Bahl et al. | 455/456.1 |
| 6,804,394 B1 | 10/2004 | Hsu | 382/173 |
| 6,850,946 B1 | 2/2005 | Rappaport et al. | 707/101 |
| 6,957,067 B1* | 10/2005 | Iyer et al. | 455/435.1 |
| 6,990,428 B1 | 1/2006 | Kaiser et al. | 702/150 |
| 7,002,943 B2* | 2/2006 | Bhagwat et al. | 370/328 |
| 7,164,663 B2* | 1/2007 | Frank et al. | 370/328 |
| 2002/0045424 A1 | 4/2002 | Lee | 455/41.2 |
| 2002/0102988 A1 | 8/2002 | Myllymaki | 455/456 |
| 2002/0115445 A1 | 8/2002 | Myllymaki | 455/456 |
| 2002/0118118 A1 | 8/2002 | Myllymaki et al. | 340/686.1 |
| 2002/0154134 A1 | 10/2002 | Matsui | 345/582 |
| 2002/0168958 A1 | 11/2002 | Ford et al. | 455/404 |
| 2002/0174335 A1 | 11/2002 | Zhang et al. | 713/168 |
| 2002/0176366 A1 | 11/2002 | Ayyagari et al. | 370/245 |
| 2003/0117985 A1* | 6/2003 | Fujii et al. | 370/338 |
| 2003/0130987 A1 | 7/2003 | Edlund et al. | 707/3 |
| 2003/0135486 A1 | 7/2003 | Edlund et al. | 707/3 |
| 2003/0135762 A1 | 7/2003 | Macaulay | 713/201 |
| 2003/0181215 A1* | 9/2003 | Cromer et al. | 455/515 |
| 2003/0219008 A1* | 11/2003 | Hrastar | 370/352 |
| 2004/0003285 A1* | 1/2004 | Whelan et al. | 713/201 |
| 2004/0008652 A1* | 1/2004 | Tanzella et al. | 370/338 |
| 2004/0023640 A1* | 2/2004 | Ballai | 455/411 |
| 2004/0047324 A1* | 3/2004 | Diener | 370/338 |
| 2004/0049699 A1* | 3/2004 | Griffith et al. | 713/201 |
| 2004/0066757 A1 | 4/2004 | Molteni et al. | 370/329 |
| 2004/0072577 A1 | 4/2004 | Myllymaki et al. | 455/456.1 |
| 2004/0076134 A1* | 4/2004 | Barber et al. | 370/338 |
| 2004/0111397 A1 | 6/2004 | Chen et al. | 707/3 |
| 2004/0151377 A1 | 8/2004 | Boose et al. | 382/193 |
| 2004/0166878 A1 | 8/2004 | Erskine et al. | 455/456.1 |
| 2004/0176108 A1* | 9/2004 | Misikangas | 455/456.5 |
| 2004/0186847 A1 | 9/2004 | Rappaport et al. | 707/101 |
| 2004/0198373 A1 | 10/2004 | Ford et al. | 455/456.1 |
| 2004/0198392 A1 | 10/2004 | Harvey et al. | 455/456.1 |
| 2004/0203910 A1 | 10/2004 | Hind et al. | 455/456.1 |
| 2004/0236547 A1 | 11/2004 | Rappaport et al. | 703/2 |
| 2004/0259554 A1 | 12/2004 | Rappaport et al. | 455/446 |
| 2004/0259555 A1 | 12/2004 | Rappaport et al. | 455/446 |
| 2005/0030929 A1* | 2/2005 | Swier et al. | 370/338 |
| 2005/0073979 A1* | 4/2005 | Barber et al. | 370/338 |
| 2005/0114649 A1* | 5/2005 | Challener et al. | 713/155 |
| 2005/0128139 A1 | 6/2005 | Misikangas et al. | 342/350 |
| 2005/0131635 A1 | 6/2005 | Myllymaki et al. | 701/205 |
| 2005/0136944 A1 | 6/2005 | Misikangas et al. | 455/456.1 |
| 2005/0185615 A1 | 8/2005 | Zegelin | 370/331 |
| 2005/0207381 A1* | 9/2005 | Aljadeff et al. | 370/338 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO98/41048 | 12/1999 |
| WO | WO99/08909 | 7/2000 |
| WO | WO97/33386 | 10/2000 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"Positioning in Wireless Networks Reference" BINARY Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "LANDMARC: Indoor Location Sensing Using Active RFID." Proceedings of the First IEEE International Conference of Pervasive Computing and Communications 2003 (PerCom '03).

G. Wolfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models." European Wireless, 2002, Florence, Italy.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/ WhereNet, Santa Clara, CA.

Small, J., Smailagic, A., and Siewiorek, D.P. "Determining User Location For Context Aware Computing Through the Use of a Wireless LAN Infrastructure." Institute for Complex Engineered Systems. Carnegie-Mellon University, Pittsburgh, PA, 2000. Available at http://www-2.cs.cmu.edu/~aura/docdir/small00.pdf.

Bahl, P. and Padmanabhan, V.N. "RADAR: An In-Building RF-based User Location and Tracking System." IEEE Infocom 2000, vol. 2, Mar. 2000, pp. 775-784.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs444n/paper.pdf.

"Positioning in Wireless Networks Reference." Downloaded on Jul. 28, 2005 from http://binary.engin.brown.edu/. BINARY Group, Division of Engineering, Brown University, Providence, RI. Available online at http://binary.engin.brown.edu/publication/Positioning_Ref.pdf.

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.htmnl.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Ekahau Logical Areas-location enabling the Wi-Fi network." Apr. 4, 2003. Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

Conley, C.. "Securing WLANS with Location-Enabled Networks." *Wireless Security Perspectives*, vol. 5,No. 3.Mar. 2003. Organization's URL: www.cnp-wireless.com/wsp.html.

"Company Information." Apr. 6, 2004. Corsair Communications: A LightBridge Company, Burlington, MA. Company's URL: www.lightbridge.com.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

P. Bahl, V.N. Padmanabhan and A. Balachandran, "A Software System for Locating Mobile Users: Design, Evaluation and Lessons," Microsoft Research Technical Report MSR-TR-2000-12, Feb. 2000.

Steven Fortune, "Algorithms for Prediction of Indoor Radio Propagation,"Proceedings of 48th IEEE Vehicular Technology Conference 98, Jan. 7, 1998. Bell Laboratories, Murray Hill, NJ 07974.

A. Rajkumar, B.F. Naylor, F. Feisullin and L. Rogers, "Predicting RF Coverage in Large Environments using Ray-Beam Tracing and Partitioning Tree Represented Geometry," submitted to the ACM Journal of Wireless Networks after revision on Oct. 12, 1995, AT&T Bell Laboratories, Murray Hill, NJ 07974.

R.A. Valenzuela, S. Fortune and J. Ling, "Indoor Propagation Prediction Accuracy and Speed Versus Number of Reflections in Image-Based 3-D Ray-Tracing," Vehicular Technology Conference, 1998. Bell Laboratories, Lucent Technologies, Holmdel, NJ 07733.

\* cited by examiner

METHOD, APPARATUS, AND SOFTWARE PRODUCT FOR DETECTING ROGUE ACCESS POINTS IN A WIRELESS NETWORK

RELATED PATENT APPLICATIONS

This invention claims the benefit of U.S. Provisional Patent Application Ser. No. 60/490,847 filed on Jul. 28, 2003, S/N titled "A METHOD, APPARATUS, AND SOFTWARE PRODUCT FOR DETECTING ROGUE ACCESS POINTS IN A WIRELESS NETWORK" to inventors Tolson, et al., assigned to the assignee of the present invention, and incorporated herein by reference.

This invention is related to pending U.S. patent application Ser. No. 10/629,384 titled "RADIOLOCATION USING A PATH LOSS DATA" to inventors Kaiser, et al., assigned to the assignee of the present invention, and incorporated herein by reference.

BACKGROUND

The present invention is related to wireless networks, and in particular to network security and detecting rogue access points in an infrastructure wireless network.

Use of wireless networks such as wireless local area networks (WLANs) is becoming widespread. Furthermore, network security is becoming more and more important. Wireless networks present important network security concerns. One such concern is detecting rogue wireless stations.

A WLAN may be ad hoc, in that any station may communicate directly with any other station, or have an infrastructure in which a station can only communicate with another station via an access point (AP). The access point is typically coupled to other networks that may be wired or wireless, e.g., to the Internet or to an intranet. That wider network is called the "wired" network herein, and it is to be understood that this wired network may be an internetwork that include other wireless networks.

One aspect of the present invention addresses detecting rogue APs. We are mostly concerned with two types of rogue APs:

An AP that is connected to a wired network of interest, e.g., to an otherwise secure LAN without authorization, and that thus may present a security hole for the secure network.

An AP that is not connected to the wired network of interest but is in the radio environment of a wireless network (WLAN) of interest. Such an AP, by accepting associations may interfere with the WLAN of interest, e.g., by hampering potential client stations ("clients") from accessing their wireless network.

A rogue AP may be a malicious or non-malicious rogue AP. A non-malicious AP, for example, is the AP of a user who sets up such an AP for personal use either connected to the wired network of interest not in the wireless network of interest, without intentionally thwarting detection. Such a user is likely to use out-of-the-box default configuration. Therefore, when used in the radio environment of a WLAN of interest, the SSID of such a non-malicious AP typically will not match the SSID of the WLAN of interest.

A malicious rogue AP is one set up by a user in order to gain access to a wired network of interest, e.g., a secure LAN. Such a malicious AP may spoof the MAC address of a legitimate AP. Such a malicious AP may further set parameters such as the power, channel, and SSID again to spoof those of a legitimate AP in order to minimize the likelihood of being detected.

WLANs suffer several potential problems because of rogue access points. A rogue access point when connected to a secure network may cause the network to become insecure if proper security measures have not been enabled on the access point. In a well-designed WLAN the access points typically have been and configured to provide a certain level of coverage and capacity. Rogue access points can cause degradation to such planned coverage and capacity by causing contention with a legitimate access point, by causing collisions with a legitimate access point, and even by possibly causing denial of service for a legitimate client station.

There therefore is a need in the art for methods of detecting rogue APs.

Prior art methods for detecting rogue access points include having clients report failed authentication attempts on other APs, or detecting failed authentication attempts by the APs themselves. For example, an authentication tattletale method is known for reporting rogue access points. See U.S. patent application Ser. No. 09/917,122 titled "ROGUE AP DETECTION" to Halasz, et al., filed 27 Jul. 2001, assigned to the assignee of the present invention, and incorporated herein by reference. Such a prior-art method typically includes configuring a station with the appropriate identifier of the WLAN—a service set identifier (SSID)—to make an authentication attempt. Only rogues that are in the proper location to the clients i.e., in radio contact for an attempt at authentication can be detected. This can result in a delayed detection or no detection at all.

Other prior art methods include using some type of sniffer device that can be carried in the WLAN coverage area. An operator periodically walks the WLAN coverage with the sniffer device making measurements to search for rogue APs. See, for example, "AiroPeek and Wireless Security: Identifying and Locating Rogue Access Points" from WildPackets, Inc., Walnut Creek, Calif. (version dated Sep. 11, 2002).

Also known is a sniffer technique that uses APs as sniffers. See, for example, the document "AirWave Rogue Access Point Detection," from AirWave Wireless, Inc., San Mateo, Calif. (www.airwave.com). Such APs are managed from a central location by a management entity. Most of the time, such a managed AP acts as regular access point. When a rogue scan is being conducted, a management entity issues a command, e.g., an SNMP command to the managed AP, converting it into a wireless sniffer. The managed AP scans the airwaves within its coverage radius, looking for traffic on all channels. The AP then reports all data back to the management entity as a trace, and then returns to normal operation mode. The management entity analyzes the traces from managed APs and sentry devices, comparing the detected APs to its database of authentic, managed APs. Such a method, however requires the AP to cease normal operation.

Prior art techniques are known for detecting rogue APs that require having a connection, e.g., a wired connection to the rogue AP. However, because a rogue AP may be a device installed at a neighboring location, detection methods that require a wired connection may not always succeed.

Thus there is a need for a detection method that does not necessarily require a client to be in the area and that does not need special client configuration and that does not need an AP to stop its normal operation.

SUMMARY

Disclosed herein are a method, apparatus, and software product for detecting rogue access points. The proposed method can automatically detect rogue APs very quickly and possibly provide a broad location indication.

In one embodiment, the method includes maintaining an AP database that includes information about managed access points (APs) and friendly APs, defined to be known APs that are in the neighborhood of the managed network or that are known to clients of managed APs, i.e., to managed clients, and that are known to not cause problems, e.g. interference, to the managed wireless network. The method further includes sending a scan request to one or more managed APs, including one or more of a request for the receiving managed AP to scan for beacons and probe responses and a request for the receiving managed AP to request its clients to scan for beacons and probe responses. The method further includes receiving reports from at least one of the receiving managed APs, a report including information on any beacon or probe response received that was sent by an AP. For each beacon or probe response on which information is received, the method analyzes the information received in the report about the AP that sent the beacon or probe response, the analyzing including ascertaining if the MAC address of the AP that sent the beacon or probe response matches a MAC address of an AP in the AP database to ascertain whether or not the AP is a potential rogue AP or a managed or friendly AP.

In another embodiment, a method implemented in an access point of a wireless network is described. The method includes receiving a scan request at the AP to scan for beacons and probe responses, the request received from a WLAN manager managing a set of managed APs and client stations of the managed APs. The WLAN's managing includes maintaining an AP database that contains information about managed APs and friendly APs of the wireless network. The method of the AP includes one or both of listening for beacons and probe responses at the AP itself or sending a client request to one or more client stations associated with the AP to listen for beacons and probe responses. In the case that a client request was sent, the method includes receiving a client report from at least one of the client stations to which the client request was sent, the client report including information on any beacon or probe response received from a potential rogue AP. The method further includes sending a scan report to the WLAN manager including information on any beacon or probe response received from a potential rogue AP by the AP receiving the scan request or, in the case that a client request was sent, by any client stations from which a report was received. The information includes the MAC address of the potential rogue AP.

For each beacon or probe response on which information is received at the WLAN manager, the WLAN manager may analyze the information received in the report about the potential rogue AP that sent the beacon or probe response, including ascertaining whether the MAC address of the potential rogue AP matches a MAC address of an AP in the AP database, leads to ascertaining whether or not the potential AP is likely to be a rogue AP.

DETAILED DESCRIPTION

Figure 1:
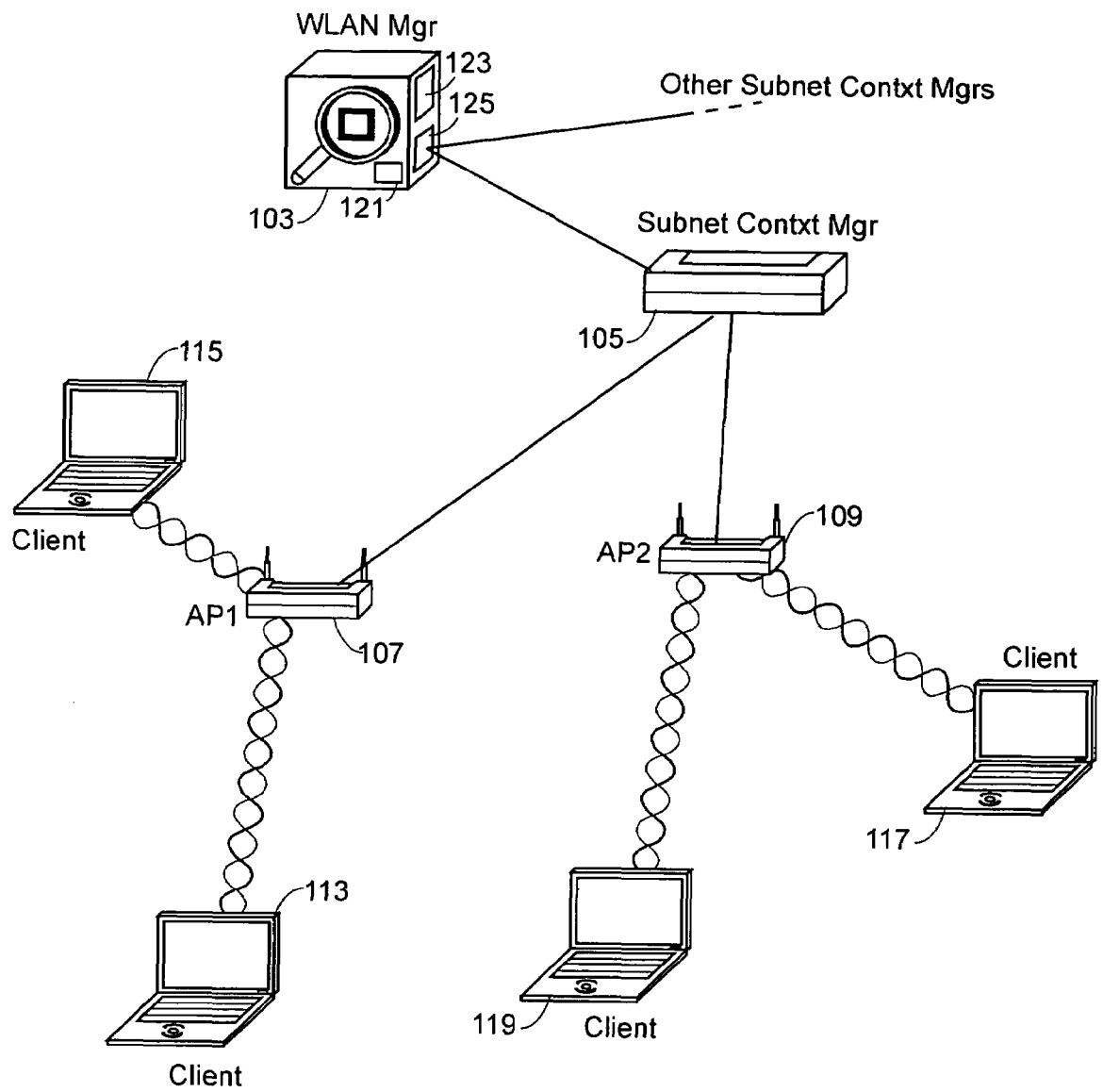
FIG. 1 shows a simple network that includes a WLAN manager on which one embodiment of the invention is implemented.

Described herein is a method for detecting rogue access points, including malicious and non-malicious access points. The invention will be described in the context of the IEEE 802.11 standard for WLANs. The invention, however, is not restricted to WLANs that conform to the IEEE 802.11 standard.

The Managed Wireless Network

One embodiment of the invention operates in a managed wireless network in which the APs and their clients are managed by a central management entity. Depending on the size and complexity, a managed network is either a set of APs with a central control entity, or a hierarchical structure with a set of hierarchical control domains. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influenced the selection of control domains include one or more of: the various types of IP subnet configurations; the radio proximity of the access points; the client station roaming patterns; the real time roaming requirements; and the physical constraints of the network (e.g. campus, building, and so forth.).

For example, one set of hierarchical domains includes a WLAN Campus Control Domain that is a region of integrated control over radio, mobility, QoS, and security aspects of a WLAN. Generally, a Campus Control Domain spans an enterprise campus that resides in a particular geographic location. Note that it is possible to have a higher-level network control entity join multiple Campus Control Domains together. As a WLAN expands it can grow large enough that a single control entity is unable to handle the intelligent control for all the APs in the campus. In such a case, the WLAN Campus Control Domain may be segmented into WLAN Local Control Domains, each providing a subset of the functionality that is seen in the WLAN Campus Control Domain. A WLAN Local Control Domain, for example, may span a single building.

A WLAN Local Control Domain may contain one or more Subnet Control Domains. The Subnet Control Domain contains all the APs within a single IP subnet or native virtual LAN (VLAN). Note that if no WLAN Local Control Domains exist, then the Subnet Control Domains would only be contained within the WLAN Campus Control Domain.

The domains are managed by one or more management entities we call managers. Because of the hierarchical nature of the control domains, the associated managers are also naturally connected in a hierarchical manner. Thus, in the example above, a controller we call the Campus Context Manager, also called the WLAN Manager is the highest point of context control in the hierarchy. The WLAN Manager manages several aspects of the wireless network, e.g., security, and in one embodiment, authorizes a set of access points in the network—we call these the managed access points—including maintaining an AP database that includes the managed APs, e.g., a list of the managed APs together with some data related to these APs. The AP database also includes information about other APs the WLAN manager knows about. The WLAN Manager also managed the rogue AP detection aspects of the present invention. A single WLAN Manager is typically deployed to handle all the wireless clients within the enterprise campus.

If a given WLAN is segmented into multiple Local Control Domains, managers we call the Local Context Managers provide the next point of context control in the WLAN hierarchy, just below the WLAN Manager. A Local Context Manager manages client context information within each of these Local Control Domains and provides nearly all the same functionality as a WLAN Manager.

Within the WLAN Local Control Domain there are various control managers that handle different aspects of the WLAN such as QoS, client context transfer and radio management. The present invention is concerned with radio management.

If no Local Control Domains exist, then the other control managers would essentially operate at the same level as the WLAN Manager.

A controller we call the Subnet Context Manager provides the lowest level of context control within the WLAN hierarchy. One Subnet Context Manager is used within each subnet (or native VLAN) to coordinate client context transfer for roaming. The Subnet Context Manager manages client context transfer within the subnet. In one embodiment, Mobile IP is supported without requiring any modification to clients. Working in conjunction with the APs, the Subnet Context Manager provides proxy-Mobile IP services, and transparently handles all Mobile IP signaling requirements on behalf of all clients within the subnet.

A controller we call the Radio Manager provides intelligent centralized control of various aspects of the radio environment within a given set of APs. A single Radio Manager handles the radio aspects of all the APs within a given WLAN Local Control Domain or the WLAN Campus Control Domain if no local control domains exist. The Radio Manager provides the ability to determine network wide radio parameters during initial network deployment and network expansion. The Radio Manager centrally coordinates all client and AP measurements, e.g., in order to detect rogue access points.

Aspects of the invention are implemented on the Radio Manager and use the measurements made under control or direction of the Radio Manager. However, the invention does not require there to be a separate Radio Manager entity. The functionality of the Radio Manager may be incorporated into any of the other entities, e.g., the Local Context Manager or WLAN Manager when there are no Local Control Domains. Furthermore, these entities may be combined with other functionalities, e.g., switching, routing, etc.

Other management entities may be included at the Local Control Domain or Campus Control Domain if there are no Local Control Domains, such as network management to provide standard device network management functionality for any of the Subnet Context Managers, Quality of Service (QoS) management, and so forth.

When a WLAN is managed, one or more aspects of the invention (and of WLAN management in general) use information that is stored in a persistent database we call the Configuration Database. The Configuration Database is the repository that all the Subnet Context Managers may use to save any persistent data. In one configuration, a single Configuration Database exists within the WLAN Campus Control Domain. The Configuration Database either coexists with the Campus Context Manager or an external database may be used. The Configuration Database also includes the AP database that includes information about the managed APs and other APs the WLAN manager is aware of.

The invention is explained herein with reference to a simple network shown in FIG. 1. The network is not divided into Local Control Domains. All managers are assumed incorporated into a single management entity—a WLAN Manager 103—that has access to the Configuration Database. It is to be understood that the WLAN Manager incorporates the functions of the Radio Manager. In one embodiment, the WLAN substantially conforms to the IEEE 802.11 standard. By substantially conforming we mean compatible with. Some aspects of the IEEE 802.11 standard are modified slightly to accommodate some management aspects used in the invention. Furthermore, stations of the network measure the received signal strength relatively accurately.

In one embodiment, each of the wireless network management entities described above is implemented as software running under a network operating system such as IOS (Cisco Systems, Inc., San Jose Calif.) on a processing system that includes one or more processors and that also carries out other network functions. Thus, the WLAN Manager, including aspects of the invention, may be implemented on a network switch or on a router. Similarly, the Subnet Context Manager may be implemented on a network switch or on a router.

In FIG. 1, the WLAN manager 103 is shown including a processing system 123 that includes one or more processors and a memory 121. The memory 121 includes instructions that cause one or more processors of the processing system 123 to implement the aspects of the present invention that are implemented in the WLAN Manager. The WLAN manager includes a network interface 125 for coupling to a network, typically wired. In one embodiment, the WLAN manager 103 is part of a network switch.

The WLAN Manager 103 is coupled via its network interface 125 and a network (typically a wired network) to a set of Subnet Context Managers. One such Subnet Context Manager is shown as element 105 in FIG. 1. All managed APs in a subnet register with a Subnet Context Manager. For example, in FIG. 1, the APs named AP1 and AP2 (107 and 109, respectively) each are part of the same subnet and have a network connection to Subnet Context Manager 105. Any management communication between the WLAN Manager 103 and APs 107 and 109 is then via the Subnet Context Manager 105.

A client station associates with an AP. Thus, in FIG. 1, APs 107 and 109 each are shown with associated clients 113, 115, and 117, 119, respectively. By a managed client we mean a client that associates with a managed AP. A managed wireless station is thus either a managed AP or a managed client. Thus, clients 113, 115, 117, and 119 are managed clients.

Figure 2:
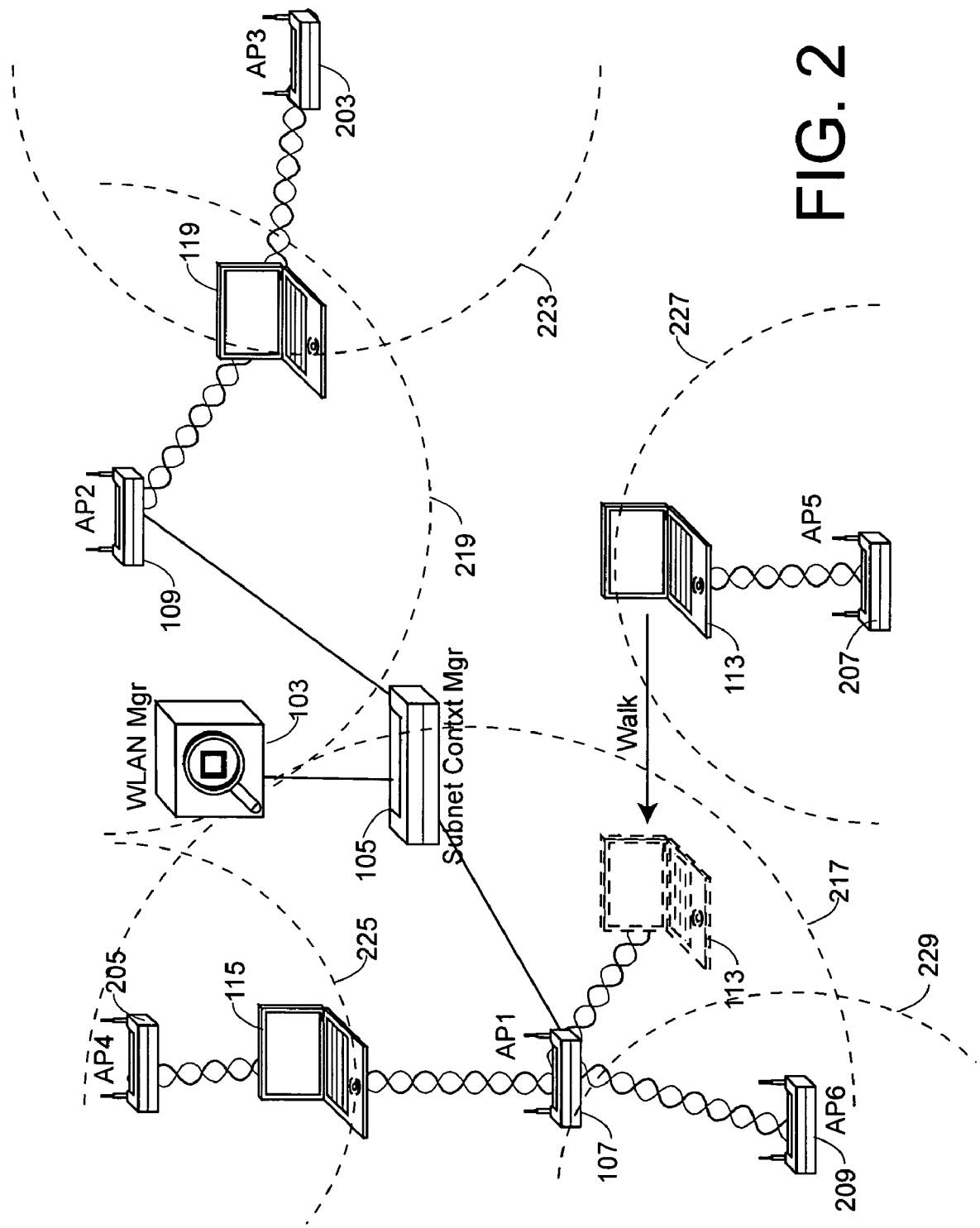
FIG. 2 shows the managed network of FIG. 1 with several rogue APs present, and illustrates the type of rogue APs that may be detected using embodiments of the invention.

FIG. 2 shows the managed network of FIG. 1 with several rogue APs present, and illustrates the type of rogue APs that may be detected using embodiments of the invention. The managed APs 107 and 109 have approximate limits of their respective radio ranges shown by dotted lines 217 and 219, respectively. By way of example, a malicious AP is shown as AP3 203 having a limit of radio range 223. Two non-malicious rogues are shown as AP4 and AP6 with reference numerals 205 and 209, respectively, and approximate limits of radio range 225 and 229, respectively. Another non-managed AP is shown as AP5 207 having an approximate limit of radio range shown as 227. In this example, suppose AP5 is at a café frequented by a managed client of managed AP 107. Thus, the rogue AP3 203 is in radio range with client 119 of managed AP2 109. Similarly, the rogue AP4 203 is in radio range with client 115 of managed AP1 107. The rogue AP6 209 is in range of the managed AP1 107. The managed client 113 is in radio range of AP5 while not in radio range of its normal managed AP 107, and later returns to the radio range of its managed AP 107.

Radio Measurement

A wireless network uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

Aspects of the invention use data from and/or about beacons and probe responses received at APs and/or client stations. The obtaining and receiving of such data is managed by the WLAN Manager 103.

By passive scanning, we mean listening for beacons and probe responses without first transmitting a probe request. Thus, for an AP, passive scanning is the listening for and recording of information from beacons and probe responses from other APs that are transmitting such beacons and probe responses. For a client, passive scanning is the listening for and recording of information from beacons and probe responses from APs other than the clients AP that are transmitting such beacons and probe responses.

The use of passive scanning is an important aspect of the invention because it provides for rogue detection concurrent with normal processing at the station, e.g., at the AP.

By active scanning, we mean transmitting a probe request prior to listening for beacons and probe responses. Both active and passive scanning can occur on the same channel used for wireless communication (the "serving" channel) or other channels ("non-serving" channels). For non-serving channels typically an active scan is used. One method we call incremental active scanning wherein the station probes another channel. Another we call full active scanning wherein the serving channel is vacated to probe all channels. Most wireless network interface devices support a mode usually called monitor mode wherein traffic on all channels is recorded, and this can be used for full active scanning.

Figure 3:
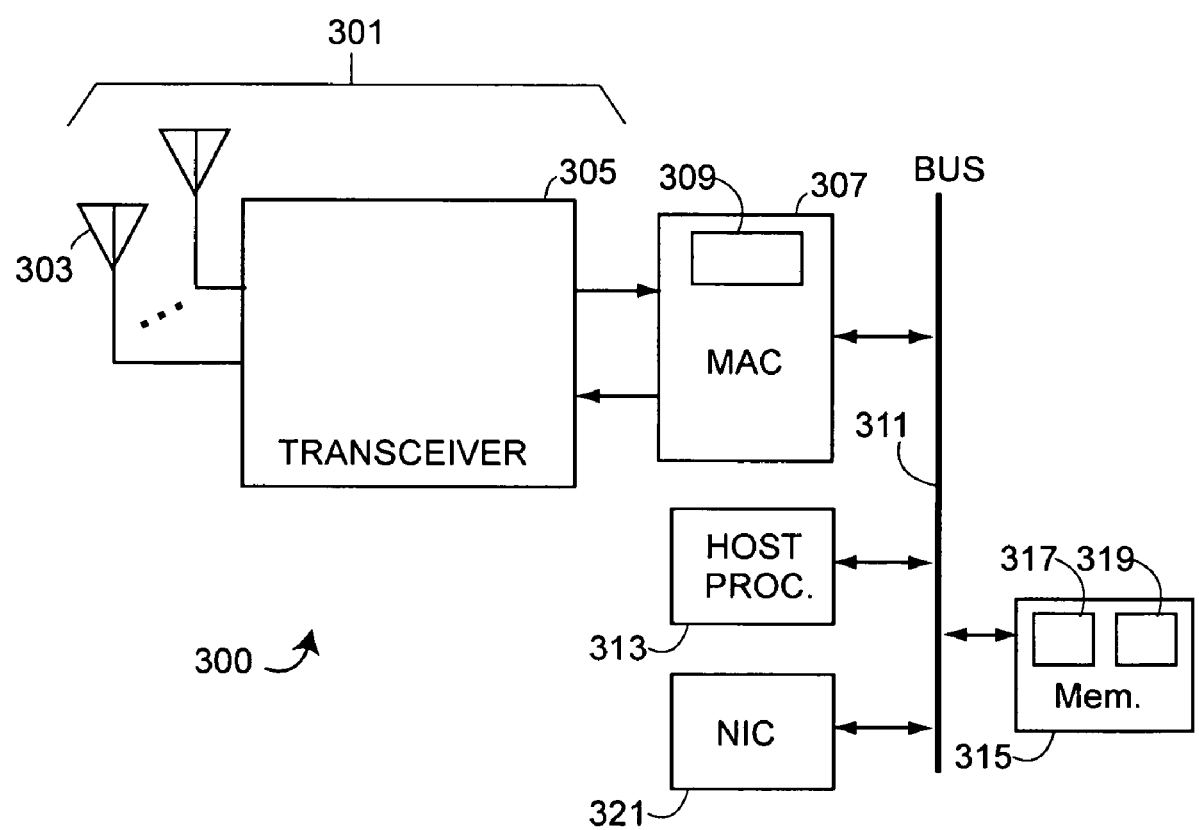
FIG. 3 shows one embodiment of a wireless station 300 that may be an AP or a client station and that implements one or more aspects of the invention.

FIG. 3 shows one embodiment of a wireless station 300 that may be an AP or a client station and that implements one or more aspects of the invention. While a wireless station such as station 300 is generally prior art, a wireless station that includes aspects of the present invention, e.g., in the form of software, is not necessarily prior art. The radio part 301 includes one or more antennas 303 that are coupled to a radio transceiver 305 including an analog RF part and a digital modem. The radio part thus implements the physical layer (the PHY). The digital modem of PHY 301 is coupled to a MAC processor 307 that implements the MAC processing of the station. The MAC processor 307 is connected via one or more busses, shown symbolically as a single bus subsystem 311, to a host processor 313. The host processor includes a memory subsystem, e.g., RAM and/or ROM connected to the host bus, shown here as part of bus subsystem 311. Station 300 includes an interface 321 to a wired network.

In one embodiment, the MAC processing, e.g., the IEEE 802.11 MAC protocol is implemented totally at the MAC processor 307. The Processor 307 includes a memory that stores the instructions for the MAC processor 307 to implement the MAC processing, and in one embodiment, some or all of the additional processing used by the present invention. The memory is typically but not necessarily a ROM and the software is typically in the form of firmware.

The MAC processor is controlled by the host processor 313. In one embodiment, some of the MAC processing is implemented at the MAC processor 307, and some is implemented at the host. In such a case, the instructions for the host 313 to implement the host-implemented MAC processing are stored in the memory 315. In one embodiment, some or all of the additional processing used by the present invention is also implemented by the host. These instructions are shown as part 317 of memory.

According to one aspect of the invention, each station such as station 300 maintains a database of the beacons and probe responses it receives. Beacons and probe responses are stored in the database under one or more circumstances, e.g., when the station determines whether or not to associate with an AP. In the context of aspects of the present invention, beacons and probe responses received at the station are stored in the database as a result of an active scan or a passive scan. We call this database the Beacon Table. As shown in FIG. 3, in one embodiment, the Beacon Table 319 is in the memory 315 of the station. Other embodiments store the Beacon Table 319 outside of memory 315. A station stores the information in the beacons and probe responses in its Beacon Table 319, and further stores additional information about the state of the station when it receives the beacon.

According to an aspect of the invention, a station such as station 300 when implementing an AP is capable of passive scanning. According to yet another aspect of the invention, a station such as station 300 when implementing a client station is capable of passive scanning.

Because the station stores beacons and probe responses it has received in its Beacon Table, one form of passive scanning includes simply reporting the accumulated contents of the station's Beacon Table. Note that an alternate embodiment may alternately include the station's listening for a specified period of time and reporting the incremental Beacon Table information for the specified period of time.

According to yet another aspect, a station such as station 300 when implementing an AP is capable of active scanning, in particular incremental active scanning. To carry out an incremental active scan, the AP vacates its serving channel and probes one or more channels by sending a probe request frame on that/those channel(s). The AP prevents client transmissions by scheduling a contention free period (CFP). Alternatively the AP can prevent client transmissions by transmitting an unsolicited CTS with a duration long enough to cover the active scan time. According to yet another aspect, station 300 when implementing a client is capable of active scanning, in particular incremental active scanning. To carry out an incremental active scan, the client station vacates its serving channel and probes one or more channels by sending a probe request frame on that/those channel(s). In the case of a client, the active scan includes reporting back the results of probing the other channel(s). In order to prevent client transmissions from the serving AP the client must indicate that it is in a power save mode. Alternatively the client can use specific local knowledge such as application operation to assure that the AP will not send any transmissions directed at the client.

Scanning includes storing the information from beacons and probe responses received at the station, e.g., by passive or active scanning in the Beacon Table.

Radio Management Tasks and Communication Protocols

Aspects of the invention use radio measurement in managed APs and their clients, in particular as a result of passive and/or active scanning for beacons and probe responses. One embodiment uses a modified MAC protocol that adds transmission power control (TPC) and dynamic frequency selection (DFS). This may be a modification of the IEEE 802.11h standard. TPC limits the transmitted power to the minimum needed to reach the furthest user. DFS selects the radio channel at an AP to minimize interference with other systems, e.g., radar. Thus the IEEE 802.11h proposal provides for power control, channel scan, and frequency selection. However, the inventors have found that 802.11's measurements decrease throughout. The IEEE 802.11h architecture (as of June 2003) uses a one-to-one request/response mechanism that may be inefficient.

Another embodiment, described in more detail herein, uses a protocol that differs from the presently proposed 802.11 protocol by providing for tasking at the AP and, in turn, at a client to autonomously carry out passive and/or active scanning for beacons and probe responses according to a schedule.

In one embodiment, the information reported includes, for each detected AP information about the detection, and information about or obtained from contents of the beacon/probe response. The detection information includes one or more of:

The detected AP's BSSID, e.g., in the form of a MAC address.
The channel the AP's probe response was received on.
The MAC address of the receiving station.
The RSSI detected at the PHY of the receiver of the beacon/probe response.
Any other measures of received signal quality of the received beacon/probe response available at the PHY of the receiving station.
Other received beacons. This may help locate the detecting station.

The beacon/probe response information sent includes one or more of:

The SSID in the beacon or probe response.
Beacon time (TSF timer) information. In one embodiment, this is sent in the form of TSF offset determined by comparing the timestamp in the beacon/probe response with the TSF timer at the managed AP receiving the response or at the managed client receiving the response.
Configuration parameters included in the received beacon/probe response.

Note that some of this information is beyond what is presently (June 2003) proposed for IEEE 802.11h. Further note that while the IEEE 802.11 standard specifies that a relative RSSI value be determined at the physical level (the PHY), one aspect of the invention uses the fact that many modern radios include a PHY that provides relatively accurate absolute RSSI measurements. Thus, the reports include the RSSI detected at the PHY of the receiver of the received beacon/probe response. In one embodiment, RSSIs detected at the PHYs are used to determine location information from path loss.

One embodiment uses a protocol we call the WLAN Manager-to-AP Measurement Protocol to set up the passive and/or active scanning and communicate reports thereof. According to this protocol, the WLAN Manager can send a message we call a Measurement Request Message to, and receives report messages we call Measurement Report Messages from one or more managed APs, either directly, or via one or more Subnet Context Managers. The messages are encapsulated in IP packets, e.g., in Ethernet frames or UDP/TCI/IP packets. In one embodiment, Ethernet is used between a Subnet Context Manager and an AP, while IP encapsulation is used for inter-subnet messages.

In the case that the Measurement Request Message is to a Subnet Context Manager, the Measurement Request Message includes a measurement request routing list where one or more APs may reside and the request message for such APs. A Subset Context Manager receiving a Measurement Request Message forwards the request message to each AP in the routing list in the form of individual Measurement Request Messages for each destination AP. Each Measurement Request Message to an AP includes a specification of what actions are to be taken, how, and when, and applies to the AP and in one embodiment, to one or more of the AP's clients. According to the Measurement Request Message, the AP schedules its own measurements. In one embodiment, the WLAN Manager-to-AP Measurement Protocol provides for requesting a stream of measurements of specified duration and recurring as a specified periodic rate. The WLAN Manager may request measurements to be performed serially or in parallel.

The AP receiving the Measurement Request Message schedules the actual measurements. In one embodiment, the AP receiving a Measurement Request Message responds with a message we call a Measurement Request Acknowledgment Message, while in another embodiment, no acknowledgement is used.

In the case that the Measurement Request Message includes a schedule for one or more clients, the AP translates the Measurement Request Message into a measurement request for each client. In one embodiment, the measurement communication between the APs and clients uses MAC frames that conform to a modification of the IEEE 802.11 standard MAC protocol we call the AP-to-client Measurement MAC Protocol herein.

An AP receiving a Measurement Request Message periodically sends a report message we call a Measurement Report Message herein that includes reports from each station performing a measurement. The report part for each station includes the type of station performing the measurement (AP, client, and so forth), the MAC of the measuring station, and the actual measurement data. In this invention, we are concerned with reports of beacons and probe responses received at a station, and such a report in one embodiment includes the received signal strength (RSSI), e.g., in dBm, the channel, the measurement duration, the BSSID, TSF information in the beacon/probe response, and of the station receiving the beacon/probe response, the beacon interval, the capability contained in the beacon, and one or more other items of information.

The Measurement Report Messages are sent directly to the WLAN manager if no Subnet Context Managers are involved. In the case a context manager is in the path to the WLAN manager, the Subnet Context Manager receives the Measurement Report Messages from a set of APs in its subnet, and aggregates these to form an aggregated report that includes the individual reports. The aggregated report is sent as a Measurement Report Message to the WLAN manager.

The AP-to-Client Measurement MAC Protocol

The AP-to-client Measurement MAC Protocol includes standard the IEEE 802.11 standard frames that are modified to include additional information that may be used by one or more embodiments of the invention. Any standard type MAC frames that conform to the AP-to-client Measurement MAC Protocol include an indication of such conformity. For example, an association request frame includes an element that indicated whether or not the station supports radio management including the ability to carry out and report the client measurements described herein. A beacon frame and a probe frame that conform to the AP-to-client Measurement MAC Protocol may include the transmit power of the AP transmitting the frame.

A frame we call the Measurement Request Frame from the AP requests an active or passive scan by a client at a scheduled scan time with a report at a scheduled reporting time. Another message from the client to the AP produces a report back to AP on schedule. The Measurement Request Frame includes an identifier to be used by a responding client, scheduling information indicate when the action is to take place, and a set of one or more measurement report elements. The measurement report elements include indications as to what sort of report is requested, for example the report from an active scan, the report from a passive scan, or the station's accumulated Beacon Table without any scan.

A frame we call the Measurement Report Frame from the client provides a report in response to a Measurement Request Frame. The Report frame includes the MAC address of the station providing the report, the identifier from the corresponding Measurement Request Frame, and one or more measurement elements. The measurement elements for the case of a beacon or probe response include one or more of the channel number, the duration over which the beacon/probe response was measured, the PHY type (DSS, 5 GHz OFDM, and so forth), the RSSI of the beacon/probe response, the parent TSF, e.g., all or some of the lower order bits of the serving AP's TSF at the time the client received the beacon or probe response, the TSF in the beacon/probe response, and one or more other elements that are in the received beacon/probe response frame.

Rogue AP Detection Using Radio Measurements

One embodiment of the rogue detection method uses information about beacons and probe responses received by APs and/or client stations that are managed by the WLAN manager 107. The method will be described by way of example using FIG. 6 that shows the tasks and messaging performed by the WLAN Manager 103, the Subnet Context Manager 105, the AP 107 in the subnet of Subnet Context Manager 105, and a client 115 of the AP 107.

Overall Method using Radio Measurements

Figure 7:
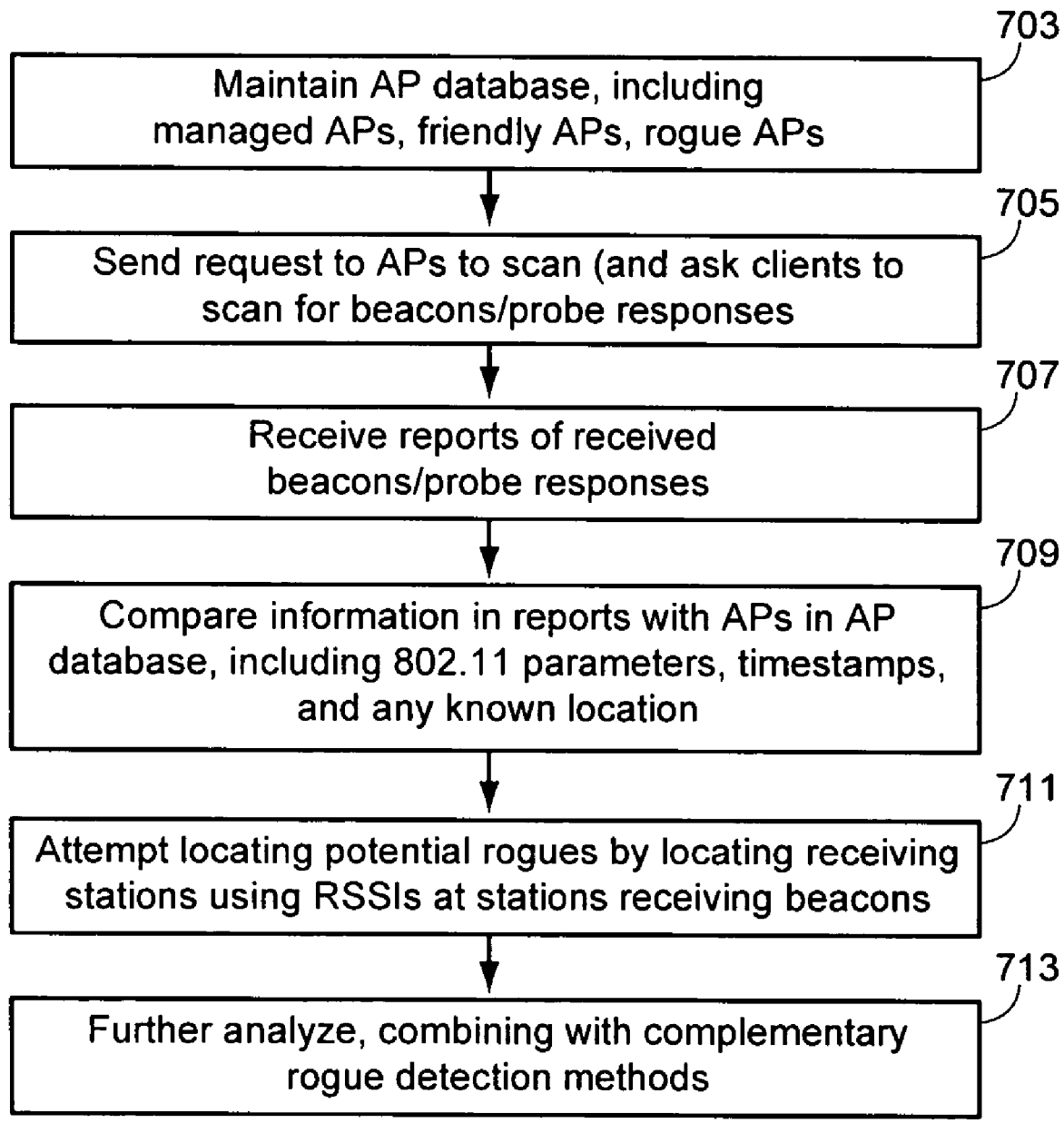
FIG. 7 shows a flow chart of one embodiment of a method of detecting rogue access points.

FIG. 7 shows the basic steps of the method. In step 703, the WLAN Manager 107 maintains an AP database that includes information about the APs that it manages. The AP database also includes information about the managed APs and about known APs that are in the neighborhood of the managed network or that are known to clients of managed APs, i.e., to managed clients, and that are known to not cause problems, e.g. interference, to the managed wireless network. Such APs are called friendly APs. One example of a friendly AP is an AP at a coffee shop where an employee of the enterprise often works using a computer that is a managed client and that associates with this friendly AP. The AP database also includes information about rogue APs. In one embodiment, the AP database is in the Configuration Database and is automatically updated from time to time.

The information stored in the AP database about an AP includes the information from any beacon or probe response frame from such an AP, and any 802.11 information about the AP. In one embodiment, the 802.11 information includes the maximum power, the frequencies, and other 802.11 parameters. In some embodiment, the information further may include location information. In some embodiment, the information for each AP may further include other fields, e.g., fields used for other aspects of wireless network management. For example, in a managed network, it may be that the radio settings of the AP are managed and thus the WLAN manager knows the radio settings for the AP. The location of the AP also may be known.

One aspect of the invention compared information obtained from scanning for beacons or probe responses to information in the AP database. The comparison is of information from managed APs and in one embodiment, the clients of the managed APs about beacons or probe responses received from a potential rogue AP with information stored in the AP database about managed APs, friendly APs, and known or suspected rogue APs.

In one embodiment, the maintaining of the AP database includes updating the information in the AP database from time to time. The updating is automatic, e.g., whenever new information is obtained on potential rogue APs or whenever AP configurations are changed.

Thus, in a step 707, the WLAN manager sends one or more requests to one or more managed APs to carry out scanning. In one embodiment, the scanning by the APs is passive scanning. In another embodiment, the scanning by the APs is active scanning of one or more channels where potential rogue APs could be transmitting. Because a rogue AP may be outside the radio range of any managed APs, but still in the range of one or more clients of managed APs, in one embodiment, the request to the managed APs includes an instruction to request such APs' clients to carry out scanning. In one embodiment, the scanning by the managed clients is passive scanning. In another embodiment, the scanning by the managed clients is active scanning of one or more channels where a potential rogue AP could be transmitting.

As a result of such request, in a step 707, the WLAN manager receives reports from the APs and their clients on any beacons and probe responses received in the scanning by the APs and/or clients.

In a step 709, the WLAN manager analyzes information obtained in the received reports about the APs that transmitted the received beacons or probe responses, the analyzing including comparing with information in the AP database. The analysis step is discussed in more detail below. In summary, step 709 is to determine whether or not the transmitting AP is in the AP database. The MAC address (the BSSID) of the AP that sent the response is used to search the AP database for a match. In one embodiment, the analysis includes comparing configuration information in the beacon/probe response with information stored in the AP database about the configuration of managed APs. In one embodiment, the analysis further includes using timing information. In one embodiment, the analysis further includes using known location information of managed APs together with the timing information to determine the approximate location of the potential rogue AP in order to further ascertain whether the AP is likely to be a rogue. The results of the analysis step 709 include a classification of each AP as a friendly AP or a potential rogue AP.

One embodiment further includes step 711 of attempting to locate the receiving stations receiving the beacon and/or probe responses in order to attempt locating the potential rogue AP(s) to further ascertain whether or not the AP is likely to be a rogue. One location method uses the RSSI at the station receiving the beacon/probe reponse together with a calibrated path loss model of the environment providing path losses at various locations to/from managed stations at known locations. The method is described further below and in concurrently filed pending U.S. patent application Ser. No. 10/629,384 titled "RADIOLOCATION USING PATH LOSS DATA" to inventors Kaiser, et al., assigned to the assignee of the present invention, and incorporated herein by reference.

One embodiment further includes step 713 of combining the results of the analysis with the results of one or more complementary rogue AP detection techniques. One such complementary technique includes a client reporting to a serving AP a failed previous authentication attempt with an AP, for example including identifying the suspected AP by its MAC address. One implementation uses an IEEE 802.1X over IEEE 802.11 security system, according to which client and APs are placed in an authentication server database. When a client authenticates, a session key gets delivered to the client and the access point separately. A client detects a failed authentication when it cannot use the session key after it has authenticated with the authentication server. The client eventually associates with another, now managed AP, and reports the potential rogue AP via the managed AP, to the WLAN manager. Such a complementary method is described in pending U.S. patent application Ser. No. 09/917,122, filed Jul. 27, 2001, titled "ROGUE AP DETECTION," to inventors Halasz, et al., assigned to the assignee of the present invention, and incorporated herein by reference.

Using the radio location, the wireless network administrator (the IT person responsible for WLAN management; a user of the WLAN manager) can attempt to physically locate the AP. After locating the AP the administrator can classify the AP as either rogue, managed or friendly and update the WLAN database with information about the AP, including its classification as rogue, managed or friendly. If a rogue AP, the network administrator can issue an alert.

In one embodiment, the set of criteria to determine whether or not the AP is friendly or a rogue is set by the wireless network administrator and stored in the Configuration Database.

Setting Up Scans and Receiving Reports

Figure 4:
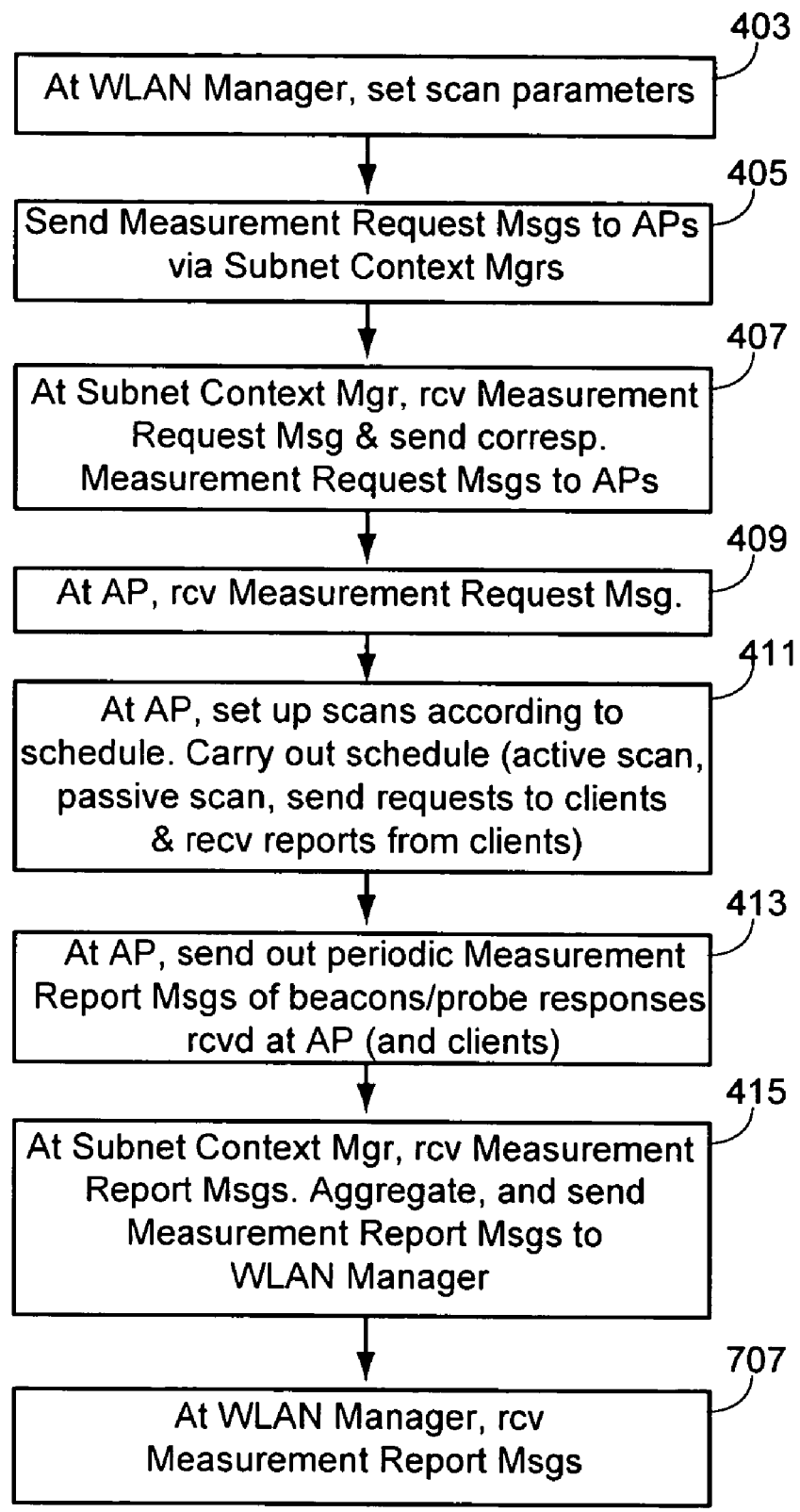
FIG. 4 shows a flow chart that includes in detail of the steps setting up, requesting, and receiving reports of the scans according to an embodiment of the invention.
Figure 6:
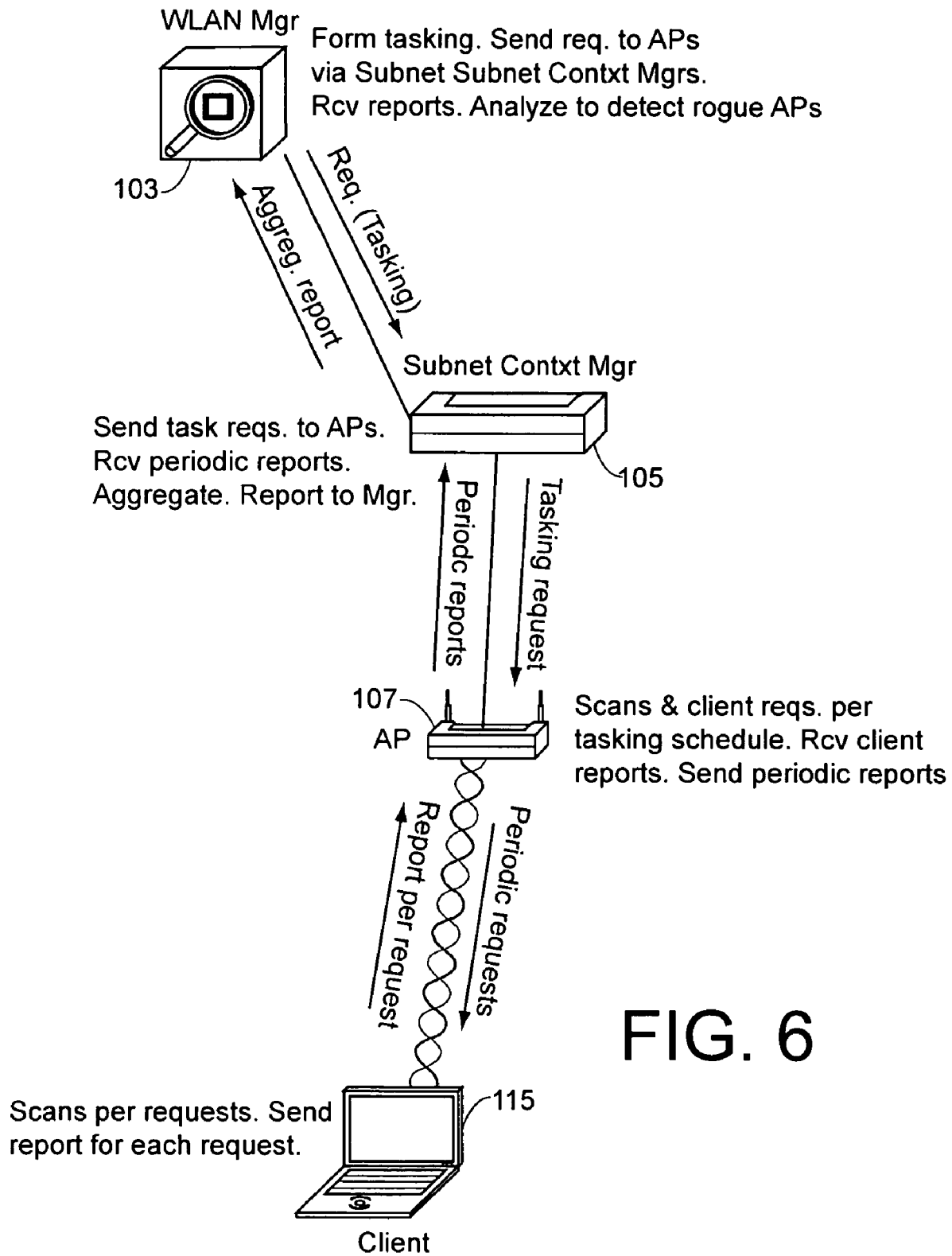
FIG. 6 shows the messaging and tasking at each entity of a simple example network.

FIG. 4 shows a flow chart that includes in more detail steps 705 and 707 of setting up, requesting, and receiving reports of the scans. Refer also to FIG. 6 that shows the messaging and tasks at each entity. In a step 403, at the WLAN manager 103, the wireless network administrator sets up a set of scan parameters that describe how information is to be obtained about beacons and probe responses received by managed APs, and in one embodiment, managed clients. The set of scan parameters includes whether an active scan or passive scan or both active and passive scan, and if an active scan, the one or more channels for the active scan. The set of scan parameters further includes the scan interval, e.g., the schedule of how often scans are to be performed, and in one embodiment, for how long. The set of scan parameters further includes an indication of whether the APs, the managed clients, or both the APs and clients are to perform the scans.

In a step 405, the WLAN manager 103 sends one or more Measurement Request Messages to the APs that instruct the APs to perform the scans and/or request their respective clients to perform the scans in the case that the wireless network includes one or more Subnet Context Managers, as in FIG. 6, the method includes forming a Measurement Request Message for each Subnet Context Manager that includes information sufficient for the Subnet Context Manager to send Measurement Request Messages to its APs.

In a step 407, the Subnet Context Manager, e.g., Subnet Context Manager 105 receives the Measurement Request Message and from the data therein, forms individual Measurement Request Messages and sends the messages to the respective target APs.

In a step 409, a target AP, e.g., AP 107 receives the Measurement Request Message and as a result, sets up tasking according to the request. The tasking includes scheduling any scans to be performed by the AP itself, and also, in the case the tasking includes for scanning by one or more clients, scheduling scans to be performed by the clients by sending request frames to the appropriate clients, and then receiving report frames from the clients. In the case that the request includes the AP performing scans, step 409 includes the AP 407 carrying out any passive and/or active scans requested in the Measurement Request Message. Such action is carried out according to the schedule in the Request Message, e.g. periodically at a scheduled interval, and so forth.

In a step 413, the AP sends out Measurement Report Messages periodically according to the schedule in the Measurement Request Message. The Measurement Report Messages include information on the beacons/probe responses received by the AP if the AP was requested to perform scanning and, if the AP was requested to instruct its clients to perform scanning, information on the beacons/probe responses received by the clients. Such information includes information from the beacon/probe response and information about the state of the station when receiving the beacon/probe response. Thus, as shown in FIG. 6, a single request message generates periodic reports from the AP 107.

In a step 413, each Subnet Context Manager, e.g., Subnet Context Manager 105 receives the Measurement Report Messages sent periodically by managed APs in its subset, e.g., AP 107 according to the schedule in the Measurement Request Message. The Subnet Context Manager 105 aggregates Measurement Report Messages into a single aggregated Measurement Report Message and sends the Measurement Report Message to the WLAN manager 103.

The WLAN Manager receives Measurement Report Messages from APs, e.g., directly or via Subnet Context Managers. This is step 707 described above.

Figure 5:
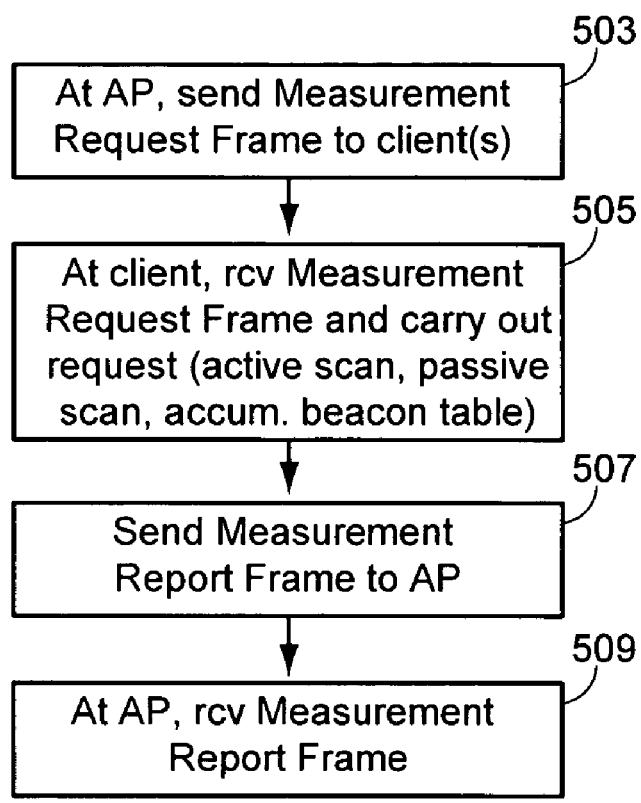
FIG. 5 is a flow chart that describes the case of a Measurement Request Message including a request to schedule a managed AP to instruct one or more clients to perform scanning and report the results, according to an embodiment of the invention.

FIG. 5 is a flow chart that describes the case of the Measurement Request Message including a request to schedule an AP to instruct one or more clients to perform scanning and report the results. The steps shown in FIG. 5 are carried out periodically according to the schedule of the Measurement Request Message. The scheduling is carried out by the AP, e.g., AP 107 of FIG. 6. Thus at a scheduled time, in a step 503, the AP sends a Measurement Request Frame to the client or clients, e.g., client 115. In a step 505, the client receives the Measurement Request Frame and according to the content of the request, carries out the requested task, e.g., carries out a passive scan, an active scan at one or more specified channels, and/or sends its accumulated Beacon Table. In a step 507, the station after carrying out any scanning requested, sends a Measurement Report Frame to its serving AP. In a step 509, the AP receives the Measurement Report Frames from all clients that were requested.

Analysis of Reports

Step 709 of analyzing the information obtained from scans is now discussed in more detail. The WLAN manager compares information received from scans about a particular AP, including the particular AP's beacon/probe response with information in the AP database. In one embodiment, the comparison searches the AP database for a match with the particular APs' BSSID. Such a comparison may lead to a match with information in the AP database and suggest, for example, that the particular AP is a managed AP. However, there is some likelihood that the particular AP is spoofing a managed AP. In one embodiment, the comparison includes one or more known AP parameters that are obtained, e.g., part or all of the IEEE 802.11 standard information normally stored in a beacon/probe response. In a managed network, some or all of the AP parameters may be set by or known to the WLAN manager and stored in the AP database. Such parameters include one or more of the maximum power settings, the frequency, and other standard 802.11 parameters, and may also include specific proprietary fields that are not part of the IEEE standard. A comparison of the parameters may further determine whether or not the particular AP is likely to be a rogue AP.

In one embodiment, analyzing the information received about a particular AP, including the beacon/probe response also includes analyzing timing information to compare with timing information that would be expected of a managed or friendly AP. The timing information analyzed is of beacon time (TSF timer) offset determined by comparing the timestamp in the beacon/probe response with the TSF timer at the managed AP receiving the response or at the managed client receiving the response. Such an analysis may lead to conclude that the AP is not a managed AP.

In one embodiment, analyzing the information received about a particular AP, including the AP's beacon/probe response includes using the RSSI level at the receiver of the beacon/probe response from the potential rogue AP. In the case the beacon/probe response was detected by a managed AP, the location of the managed AP would be known and used together with the received RSSI to approximately locate the potential probe. In the case the beacon/probe response was detected by a client of a managed AP, the timing information may lead the WLAN manager to infer some location information. For example, the timing information may provide an indication of when the client detected the beacon/probe response in relation to the time the client associated with the managed AP whose location is known.

Thus, the RSSI together with location information of managed APs and clients are used to approximately determine the location of the potential rogue AP in order to further ascertain whether the AP is likely to be a rogue. For example, this may provide the location to the nearest floor of a building.

Locating the Potential Rogues

Once potential rogues are identified, and even approximately located, e.g., to the level of a floor of a building, or within radio range of an AP of known location, one aspect of the invention is further locating the potential rogues using received signal strength information. One location method uses the RSSI at the station receiving the beacon/probe response together with a calibrated path loss model of the environment providing path losses at various locations to/from managed stations at known locations. The method is summarized here and described in more detail in concurrently filed pending U.S. patent application Ser. No. 10/629,384 titled "RADIOLOCATION USING PATH LOSS DATA" to inventors Kaiser, et al., assigned to the assignee of the present invention, and incorporated herein by reference.

In the case that the beacons/probe responses are detected by a set of managed APs, the locating method includes accepting an ideal path loss model and calibrating the ideal path loss model using path loss measurements between the managed access points in a region of interest, e.g., the floor of the building. The path loss measurements include the WLAN manager obtaining the received signal strengths from each respective access point receiving probe responses/beacons, e.g., on the channel that the rogue transmissions were received, for signals received as a result of probe responses/beacon transmissions by each other access point. Each transmission by a respective access point is at a known respective transmit power. The calibrating determines a calibrated path loss model between the managed access points.

The locating method further includes measuring the path loss between the potential rogue access point and at least some of the managed access points. The measuring is by the beacon/probe response reporting described herein. The measuring includes measuring the received signal strength at each of at least some of the access points of the wireless network resulting from transmission of a beacon/probe response from the potential rogue access point for each of a set of assumed transmit powers for the potential rogue access point. The method further includes determining the likely location or locations of the wireless station using the measured path loss and the calibrated path loss model for the set of assumed transmit powers.

In the case the beacon/probe responses are detected at one or more clients, the location of the clients is first determined using a client-locating variant of the radio location method. The client at an unknown location receives beacons/probe responses from managed access points in the area of interest. The beacon/probe responses are at known transmit powers. The path loss is measured for each transmitting access point using reports from the receiving client station at an unknown location. The likely location or locations of the client station is determined comparing the received path loss components with the calibrated path loss model.

Once the location of the clients receiving the beacons/probe responses from the potential rogue AP are estimated, the method proceeds as for the case of APs receiving the transmissions from the potential rogue, with the determined location used as the "known" location of the receiving clients.

In the location determining (of a client or a potential access point), one embodiment includes using an exclusive likelihood function to provide a likelihood component as a function of location for each station at a known or determined location detecting a beacon or probe response from the potential rogue AP. One embodiment further uses an exclusive likelihood function to provide a likelihood component as a function of location for each station at a known or determined location that fails to detect a beacon or probe response from the potential rogue AP. In the case of the failure to detect, the station that fails to detect is assumed to receive at a particular signal strength, e.g., the specified receive sensitivity of the receiver of the station. The overall likelihood is the product of the inclusive and exclusive likelihood components. This is determined for each of the set of assumed transmit powers.

While FIG. 1 shows a network that includes Subnet Context Managers for subnets, embodiments of the invention also operate in networks with no Subnet Context Managers, and larger networks that are further divided into other control domains. In the case of a smaller network than in FIG. 1, the communication that in a network such as FIG. 1 is between subnet context manager and its APs is then carried out directly between the WLAN Manager and the APs.

While in one embodiment, each Measurement Request Frame received at a client station generates a single Measurement Report Frame. In alternate embodiments, the client station may carry out tasking, e.g., schedule scanning events.

It should be appreciated that although the invention has been described in the context of the IEEE 802.11 standard, the invention is not limited to such contexts and may be utilized in various other applications and systems, for example other WLAN standards and other wireless standards.

One embodiment of each of the methods described herein is in the form of a computer program that executes on a processing system, e.g., one or more processors that are part of a WLAN manager. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer-readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:

a central management entity managing managed access points (APs) of a wireless network, including carrying out one or both of power control and frequency selection to configure one or more configuration parameters of the managed access point;

maintaining an AP database that includes information about managed APs and friendly APs of the wireless network, including for each managed AP in the AP database, the service set identifier of the managed AP and one or more of the configuration parameters;

sending a scan request to one or more managed APs of the wireless network, the scan request including a request for the receiving managed AP to scan for beacons and probe responses; and receiving reports from at least one of the receiving managed APs about beacons or probe responses from any potential rogue AP, including, for each potential rogue AP from which a beacon or probe response was received, detection information, and information on the beacon or probe response received sent by the potential rogue AP, wherein the detection information includes the service set identifier of the potential rogue AP, and at least one further item of information, and wherein the information on the received beacon or probe response includes at least the service set identifier in the beacon or probe response, and one or more configuration parameters; and for each beacon or probe response from a potential rogue AP on which information is received, ascertaining if the potential rogue AP is a managed AP, including:

ascertaining if there is a match for the service set identifier of the potential rogue AP in the AP database, and if there is a match for one or more configuration parameters of the potential rogue AP in the AP database in addition to the service set identifier of the potential rogue AP, such that at least a plurality of parameters are matched in the AP database to ascertain whether a potential rogue AP is a managed AP.

2. A method as recited in claim 1, wherein the wireless network substantially conforms to the IEEE 802.11 standard for wireless local area networks.

3. A method as recited in claim 1, wherein the maintaining the AP database includes updating the AP database from time to time.

4. A method as recited in claim 1, wherein the analysis further includes determining the approximate location of the potential rogue AP in order to further ascertain whether the potential rogue AP is likely to be a rogue, a location determining method that uses information determined from signals received from the potential rogue AP at a plurality of managed APs whose locations are known or at stations whose respective locations are known or determined, and calculating a likely location using the determined information.

5. A method as recited in claim 1, wherein the sending a request includes sending a request to one or more wireless stations of the wireless network to listen for beacons and probe responses on the respective serving channels of the respective wireless stations and to report the results of the listening.

6. A method as recited in claim 1, wherein the sending a request includes sending a request for one or more wireless stations to temporarily listen for beacons and probe responses on a channel specified in the request and to report the results of the listening.

7. A method as recited in claim 1, wherein the sending a request includes sending a request for one or more managed access points to listen for beacons and probe responses and to report the results of the listening.

8. A method as recited in claim 1, wherein the sending a request includes sending a request for one or more clients of one or more managed access points to listen for beacons and probe responses and to report the results of the listening.

9. A method as recited in claim 1, wherein the analyzing further includes using timing information determined from the beacon or probe response to further ascertain whether the AP is likely to be a rogue.

10. A method as recited in claim 9, wherein the analyzing further includes using known location information of managed APs together with the timing information to determine the approximate location of the potential rogue AP.

11. A method as recited in claim 1, wherein the detection information includes absolute RSSI information, and wherein the analyzing further includes using known location information of managed APs to approximately locate the potential rogue AP, and method further comprising:

locating the potential rogue AP by using the absolute RSSI at the station receiving the beacon or probe response together with a calibrated path loss model of an area of interest that provides path losses at various locations to or from managed stations at known locations.

12. A method as recited in claim 11, wherein the locating includes:

accepting an ideal path loss model applicable to an area of interest;

calibrating the ideal path loss model using measurements received from each respective managed station of a first set of managed wireless stations of the wireless network measuring the received signal strengths at each of the respective managed stations, the managed stations receiving signals as a result of transmissions by respective managed stations of a second set of managed wireless stations of the wireless network, each respective transmission at a known respective transmit power, the locations of each managed station of the first and second set being known or determined, the calibrating being to determine a calibrated path loss model between the receiving and transmitting wireless stations;

receiving measurements from each respective managed station of a third set of managed wireless stations of the wireless network measuring the received signal strength at each of the respective stations resulting from transmission of a beacon or probe response from a potential rogue access point, each station of the third set being at a known or determined location; and for each of a set of assumed transmit powers for the potential rogue access point, determining the likely location or locations of the potential rogue access point using the received signal strengths at the stations of the third set and the calibrated path loss model.

13. A method as recited in claim 12, wherein the determining of the likely location or locations includes:

determining a set of likelihood components for each of a set of locations, each component corresponding to a respective managed access point whose transmissions are listened for at the particular station, and determining an overall likelihood for each of the set of locations as the product of the likelihood components.

14. A method as recited in claim 1, wherein further comprising combining the results of the analyzing step with the results of one or more complementary rogue AP detection techniques.

15. A method as recited in claim 14, wherein one of the complementary rogue AP detection techniques includes a client reporting to a managed AP a failed previous authentication attempt with an AP.

16. A method comprising:

receiving a scan request at an access point (AP) of a wireless network to scan for beacons and probe responses, the request received from a management entity coupled to a WLAN manager managing a set of managed APs, the managing of the managed APs including carrying out one or both of power control and frequency selection to configure one or more configuration parameters of the managed APs and maintaining an AP database that contains information about managed APs and friendly APs of the wireless network, the information in the AP database including for each managed AP in the AP database, the service set identifier of the managed AP and one or more of the configuration parameters;

listening for beacons and probe responses at the AP receiving the scan; and sending a scan report to the WLAN manager including information on any beacon or probe response received from a potential rogue AP by the AP receiving the scan request, the information including, for each potential rogue AP from which a beacon or probe response was received, detection information, and information on the beacon or probe response from the potential rogue AP, wherein the detection information includes the service set identifier of the potential rogue AP, and at least one further item of information, and wherein the information on the received beacon or probe response includes at least the service set identifier in the beacon or probe response, and one or more configuration parameters, such that for each beacon or probe response from a potential rogue AP on which information is received at the WLAN manager, ascertaining if the potential rogue AP is a managed AP, including:

ascertaining if there is a match for the service set identifier of the potential rogue AP in the AP database, and if there is a match for one or more configuration parameters of the potential rogue AP in the AP database in addition to the service set identifier of the potential rogue AP, such that at least a plurality of parameters are matched in the AP database to ascertain whether a potential rogue AP is a managed AP.

17. A method as recited in claim 16, wherein the scan request includes a request to scan for beacons and probe responses on the respective serving channel of each respective wireless AP or client station and to report the results of the listening.

18. A method as recited in claim 16, wherein the scan request a includes a request for the listening stations AP or client station to temporarily listen for beacons and probe responses on a channel specified in the request and to report the results of the listening.

19. A method as recited in claim 16, wherein the scan request from the WLAN manager and the scan report to the WLAN manager use a protocol that provides for and encapsulates scan request messages and scan report messages in IP packets.

20. A method as recited in claim 19, wherein the request from an AP to a client station, and the report from the client station to an AP uses MAC frames.

21. A method as recited in claim 19, wherein the scan request includes a set of scan parameters that describe how information is to be obtained about beacons and probe responses received by the managed.

22. A method as recited in claim 21, wherein the scan parameters include one or more of:

whether the requested scan is an active scan or a passive scan or both an active and passive scan, and if an active scan, one or more channels for the active scan, and the schedule of how often scans are to be performed.

23. A method as recited in claim 21, wherein after receiving the task request, the receiving AP sets up tasking according to the scan request, including scheduling any scans to be performed by the receiving AP.

24. A computer-readable medium encoded with computer readable instructions that when executed cause one or more processors of a processing system to execute a method comprising:

managing managed access points (APs) of a wireless network, including carrying out one or both of power control and frequency selection to configure one or more configuration parameters of each managed access point;

maintaining an AP database that includes information about managed APs and friendly APs of the wireless network, including for each managed AP in the AP database, the service set identifier of the managed AP and one or more of the configuration parameters;

sending a scan request to one or more managed APs of the wireless network, the scan request including a request for the receiving managed AP to scan for beacons and probe responses; and receiving reports from at least one of the receiving managed APs about beacons or probe responses from any potential rogue AP, including, for each potential rogue AP from which a beacon or probe response was received, detection information, and information on the beacon or probe response received sent by the potential rogue AP, wherein the detection information includes the service set identifier of the potential rogue AP, and at least one further item of information, and wherein the information on the received beacon or probe response includes at least the service set identifier in the beacon or probe response, and one or more configuration parameters; and for each beacon or probe response from a potential rogue AP on which information is received, ascertaining if the potential rogue AP is a managed AP, including:

ascertaining if there is a match for the service set identifier of the potential rogue AP in the AP database, and if there is a match for one or more configuration parameters of the potential rogue AP in the AP database in addition to the service set identifier of the potential rogue AP, such that at least a plurality of parameters are matched in the AP database to ascertain whether a potential rogue AP is a managed AP.

25. A computer-readable medium encoded with computer readable instructions to instruct one or more processors of a processing system to execute a method at an access point (AP) of a wireless network comprising:

receiving a scan request to scan for beacons and probe responses, the request received from a management entity coupled to a WLAN manager managing a set of managed APs, the managing of the managed APs including carrying out one or both of power control and frequency selection to configure one or more configuration parameters of the managed APs and maintaining an AP database that contains information about the managed APs and friendly APs of the wireless network, the information in the AP database including for each managed AP in the AP database, the service set identifier of the managed AP and one or more of the configuration parameters;

listening for beacons and probe responses at the AP receiving the scan request; and sending a scan report to the WLAN manager including information on any beacon or probe response received from a potential rogue AP by the AP receiving the scan request, the information including, for each potential rogue AP from which a beacon or probe response was received, detection information, and information on the beacon or probe response from the potential rogue AP,
wherein the detection information includes the service set identifier of the potential rogue AP, and at least one further item of information, and
wherein the information on the received beacon or probe response includes at least the service set identifier in the beacon or probe response, and one or more configuration parameters, such that for each beacon or probe response from a potential rogue AP on which information is received at the WLAN manager, ascertaining if the potential rogue AP is a managed AP, including:
ascertaining if there is a match for the service set identifier of the potential rogue AP in the AP database, and if there is a match for one or more configuration parameters of the potential rogue AP in the AP database in addition to the service set identifier of the potential rogue AP
such that at least a plurality of parameters are matched in the AP database to ascertain whether a potential rogue AP is a managed AP.

26. An apparatus comprising:
a processing system including a memory and a network interface to couple the apparatus to a network, the network including a set of managed access points (APs) of a wireless network; and
a tangible medium storing an AP database coupled to the processing system and containing information about the managed APs and friendly APs of the wireless network, including information related to how each managed AP in the AP database is configured,
wherein the processing system is programmed to:
manage the managed APs, including carrying out one or both of power control and frequency selection to configure one or more configuration parameters of each managed access point;
maintain the AP database that includes information about the managed APs, including for each managed AP, the service set identifier of the managed AP and one or more of the configuration parameters;
send a scan request to one or more managed APs of the wireless network, the scan request being for the receiving managed AP to scan for beacons and probe responses; and
receive reports from at least one of the receiving managed APs about beacons or probe responses from any potential rogue AP, including, for each potential rogue AP from which a beacon or probe response was received, detection information, and information on the beacon or probe response received sent by the potential rogue AP,
wherein the detection information includes the service set identifier of the potential rogue AP, and at least one further item of information, and
wherein the information on the received beacon or probe response includes at least the service set identifier in the beacon or probe response, and one or more configuration parameters; and
for each beacon or probe response from a potential rogue AP on which information is received, ascertaining if the potential rogue AP is a managed AP, including:
ascertaining if there is a match for the service set identifier of the potential rogue AP in the AP database, and if there is a match for one or more configuration parameters of the potential rogue AP in the AP database in addition to the service set identifier of the potential rogue AP,
such that at least a plurality of parameters are matched in the AP database to ascertain whether a potential rogue AP is a managed AP.

27. An access point (AP) for a wireless network, the access point comprising:
a processing system including a memory;
a network interface to couple the access point to a network;
a wireless transceiver coupled to the processing system to implement the PHY of a wireless station;
the processing system including a MAC processor and programmed to:
receive a scan request to scan for beacons and probe responses, the request received via the network interface from a management entity coupled to a WLAN manager coupled to the network and managing a set of managed, the managing including carrying out one or both of power control and frequency selection to configure one or more configuration parameters of managed APs and maintaining an AP database that contains information about managed APs and friendly APs of the wireless network, including for each managed AP in the AP database, the service set identifier of the managed AP, and one or more of the configuration parameters; and
send a scan report to the WLAN manager via the network interface, including information on any beacon or probe response received from a potential rogue AP, the scan report including for each potential rogue AP beacon or probe response was received, detection information, and information on the beacon or probe response from the potential rogue AP,
wherein the detection information includes the service set identifier of the potential rogue AP, and at least one further item of information, and
wherein the information on the received beacon or probe response includes at least the service set identifier in the beacon or probe response, and one or more configuration parameters,
such that for each beacon or probe response on which information is received at the WLAN manager, analyzing the information received in the report about the potential rogue AP that sent the beacon or probe response includes, in order to ascertain if the potential rogue AP is a managed AP:
(a) ascertaining if there is a match for the service set identifier of the potential rogue AP in the AP database, and
(b) ascertaining if there is a match for one or more configuration parameters of the potential rogue AP in the AP database in addition to the service set identifier of the potential rogue AP,
such that at least a plurality of parameters are matched in the AP database to ascertain whether a potential rogue AP is a managed AP.

28. A method as recited in claim 1, wherein the information stored in the AP database on each managed AP includes a maximum power setting or a frequency setting or both a maximum power and a frequency setting.

29. A method as recited in claim 1, wherein the detection information includes at least the channel the detected AP's beacon or probe response was received on, and wherein the information on the received beacon or probe response includes at least a service set identifier in the beacon or probe response.

30. A method as recited in claim 1, wherein the sending a scan request to one or more managed APs of the wireless network includes a request for the receiving managed AP to request the AP's clients to scan for beacons and probe responses.

31. A method as recited in claim 16, wherein the information stored in the AP database on each managed AP includes a maximum power setting or a frequency setting or both a maximum power and a frequency setting.

32. A method as recited in claim 16, wherein the detection information includes at least the channel the detected AP's beacon or probe response was received on, and wherein the information on the received beacon or probe response includes at least a service set identifier in the beacon or probe response.

33. A method as recited in claim 16, wherein the management entity also manages any client stations of the managed APs, and wherein the receiving a scan request also includes a request to request any associated clients to listen for beacons or probe responses, the method further comprising:

sending a client request to one or more client stations associated with the AP to listen for beacons and probe responses; and in the case that a client request was sent, receiving a client report at the AP from at least one of the client stations to which the client request was sent, the client report including information on any beacon or probe response received from a potential rogue AP.

34. A computer-readable medium as recited in claim 24, wherein the information stored in the AP database on each managed AP includes a maximum power setting or a frequency setting or both a maximum power and a frequency setting.

35. A computer-readable medium as recited in claim 24, wherein the detection information includes at least the channel the detected AP's beacon or probe response was received on, and wherein the information on the received beacon or probe response includes at least a service set identifier in the beacon or probe response.

36. A computer-readable medium as recited in claim 24, wherein the sending a scan request to one or more managed APs of the wireless network includes a request for the receiving managed AP to request the AP's clients to scan for beacons and probe responses.

* * * * *